US012799037B2

(12) United States Patent
Goswami et al.

(10) Patent No.: US 12,799,037 B2
(45) Date of Patent: Nov. 17, 2026

(54) ENHANCING THE STRENGTH OF Al—$B_4C$ COMPOSITES TO A HIGH DEGREE BY MG ADDITION

(71) Applicant: The Government of the United States of America, as represented by the Secretary of the Navy, Arlington, VA (US)

(72) Inventors: Ramasis Goswami, Alexandria, VA (US); Syed B. Qadri, Fairfax Station, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 782 days.

(21) Appl. No.: 18/107,224

(22) Filed: Feb. 8, 2023

(65) Prior Publication Data

US 2023/0257308 A1 Aug. 17, 2023

Related U.S. Application Data

(60) Provisional application No. 63/309,539, filed on Feb. 12, 2022.

(51) Int. Cl.

| | |
|---|---|
| ***C04B 35/563*** | (2006.01) |
| ***C04B 35/626*** | (2006.01) |
| ***C04B 41/00*** | (2006.01) |

(52) U.S. Cl.

CPC ...... *C04B 35/563* (2013.01); *C04B 35/62615* (2013.01); *C04B 35/62695* (2013.01);

(Continued)

(58) Field of Classification Search

CPC ................................................. C22C 32/0057

See application file for complete search history.

(56) References Cited

FOREIGN PATENT DOCUMENTS

| | | | | |
|---|---|---|---|---|
| JP | 2016113696 A | * | 6/2016 | |
| KR | 20160072761 A | * | 6/2016 | ............ C04B 35/10 |

OTHER PUBLICATIONS

English text JP-2016113696-A (Year: 2016).*

(Continued)

*Primary Examiner* — Benjamin L Utech

(74) *Attorney, Agent, or Firm* — US Naval Research Laboratory; Stephen T. Hunnius

(57) ABSTRACT

A method of making an Al—$B_4C$ composite with Mg addition comprising providing a first mixture of $B_4C$, Al and Mg powder, producing a powder mixture, adding Mg to the powder mixture, forming pellets, creating a composite, annealing the composite, and forming an Al—Mg—$B_4C$ composite. An Al—$B_4C$ composite with Mg addition comprising Al, Mg comprising 4 wt. %, and $B_4C$ comprising 8 wt. %. An Al—$B_4C$ composite with Mg addition made from the steps comprising providing a first mixture of $B_4C$, Al and Mg powder, producing a powder mixture, adding Mg to the powder mixture, forming pellets, creating a composite, annealing the composite, and forming an Al—Mg—$B_4C$ composite.

6 Claims, 12 Drawing Sheets

(52) U.S. Cl.
CPC .. *C04B 41/0081* (2013.01); *C04B 2235/3821* (2013.01); *C04B 2235/401* (2013.01); *C04B 2235/402* (2013.01); *C04B 2235/5445* (2013.01); *C04B 2235/61* (2013.01)

(56) References Cited

OTHER PUBLICATIONS

English text KR-20160072761-A (Year: 2016).*
Rosso, Mario. "Ceramic and metal matrix composites: Routes and properties." Journal of materials processing lechnology 175.1-3 (2006): 364-375.
Arslan, Gursoy, and Ayse Kalemtas. "Processing of silicon carbide-boron carbide-aluminium composites." Journal of the European Ceramic Society 29.3 (2009): 473-480.
Gudipudi, Suresh, et al. "Enhanced mechanical properties of AA6061-B4C composites developed by a novel ultra-sonic assisted stir casting." Engineering Science and Technology, an International Journal 23.5 (2020): 1233-1243.
Goswami, R., S. B. Qadri, and H. Ryou. "Correlation of Fine Scale Microstructure and Mechanical Properties of Copper-Alumina Nanocomposites." Metal-Matrix Composites: Advances in Analysis, Measurement, and Observations. Springer International Publishing, 2021.
Zhang, Liu, et al. "Phase transformation and mechanical properties of B4C/Al composites." Journal of Materials Research and Technology 9.2 (2020): 2116-2126.
Zan, Y. N., et al. "Enhancing high-temperature strength of B4C—6061Al neutron absorber material by in-situ Mg (Al) B2." Journal of Nuclear Materials 526 (2019): 151788.

* cited by examiner

ENHANCING THE STRENGTH OF Al—$B_4C$ COMPOSITES TO A HIGH DEGREE BY MG ADDITION

REFERENCE TO RELATED APPLICATION

This application is a non-provisional of, and claims priority to and the benefits of, U.S. Provisional Patent Application No. 63/309,539 filed on Feb. 12, 2022, and U.S. Provisional Patent Application No. 63/420,060 filed on Oct. 27, 2022, the entireties of each are herein incorporated by reference.

BACKGROUND

This disclosure concerns increasing the strength of Al—$B_4C$ composites significantly with alloy addition.

We demonstrate here for the first time a new product wherein the Mg addition improves interfacial adhesion between the matrix and ceramic particles as a result of interfacial boride formation, and primarily contributes to the enhancement of strength of the composites.

The experimentally observed strength of our new Al—Mg—$B_4C$ composite is greater than 1.0 GPa for composite containing 12% $B_4C$.

Our method provides a new method of developing high-strength-light-weight composites.

Considerable work has been done to produce dispersion strengthened Metal matrix composites, MMCs, by adding various volume fractions of $B_4C$ in Al matrix. These hard ceramic particles are mostly added in liquid metal to form MMCs upon solidification. However, this method tends to produce more inhomogeneity upon solidification in the composites, because the solid/liquid interface pushes the hard ceramic particles towards the end, which results in inhomogeneity in the solidified product.

To achieve better homogeneity, aluminum based MMCs were manufactured in the solid state reinforced with $B_4C$ particles. Although, the composites show higher hardness as compared to the base Al alloys, the enhancement of hardness or strength level is relatively small as the bonding between Al and $B_4C$ is weak, and composites mostly fail as a result of de-bonding at metal/ceramic interface. It has been realized a thin layer of a metal-boride phase at the interface could improve the adhesion between Al and $B_4C$. In the temperature range of 600 to 700° C., mostly $AlB_2$ forms between Al and $B_4C$. At higher temperatures, other aluminum borides, $Al_4BC$ and $AlB_{12}$, have been reported. In addition, the hard ceramic particles need to be incorporated and finely dispersed within grains to impede the dislocation motion, so the Orowan strengthening mechanism is operative.

Thus, to increase the strength, one needs to improve the interfacial characteristics of the metal/ceramic interface as well as incorporate and disperse hard ceramic particles within the matrix.

The motivation here is to enhance the strength level of Al matrix composites close to or greater than 1 GPa, so the light-weight composites are comparable with the high-strength steel, titanium, and copper-base alloys.

SUMMARY OF DISCLOSURE

Description

This disclosure concerns increasing the strength of Al—$B_4C$ composites significantly with alloy addition.

We demonstrate here for the first time a new product wherein the Mg addition improves interfacial adhesion between the matrix and ceramic particles as a result of interfacial boride formation, and primarily contributes to the enhancement of strength of the composites. The experimentally observed strength of our Al—Mg—$B_4C$ composite is greater than 1.0 GPa for composite containing 12% $B_4C$.

Our method provides a new method of developing high-strength-light-weight composites and a new Al—Mg—$B_4C$ composite.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

FIG. 2 illustrates a plot of hardness as a function of $B_4C$ content in the composite.

FIG. 4 illustrates the HRTEM image of two $B_4C$ particle within a grain.

FIG. 8 illustrates the reaction at different places of $B_4C$.

FIG. 9 illustrates the TEM image showing the interaction zone by a dash line. FIG. 9 illustrates the HRTEM image showing the boride phase formation in the reaction zone. FIG. 9 illustrates the fast Fourier transforms (FFTs) from the boride phase and the matrix, respectively.

FIG. 11 illustrates the FFTs obtained from the matrix and the reacted region, respectively, close to the [1-10] zone of the matrix.

DETAILED DESCRIPTION OF THE INVENTION

Figure 1:
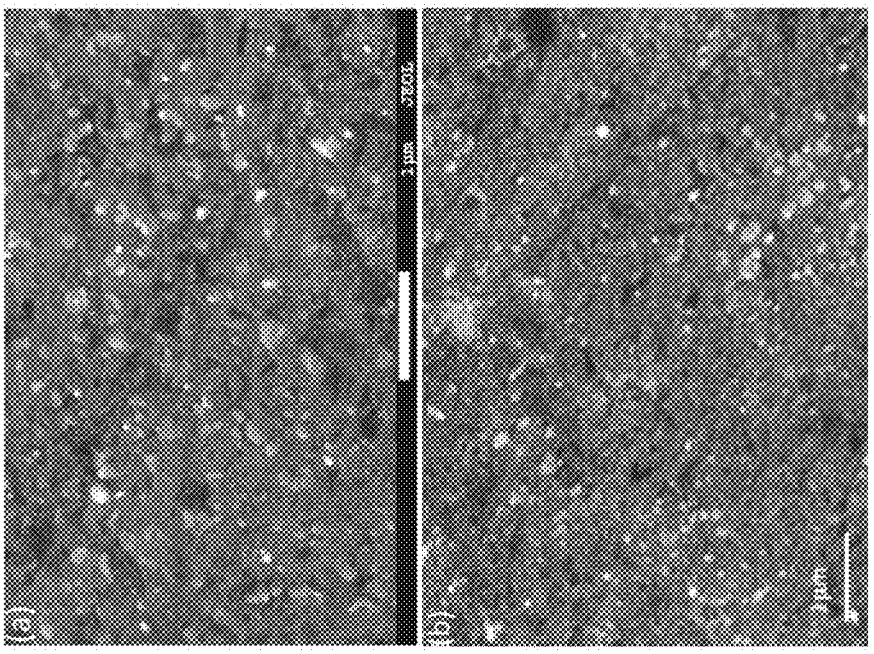
FIG. 1 illustrates SEM images after consolidating the composites. Illustrated is Al-4% Mg-12% $B_4C$ composites and Al-4% Mg-8% $B_4C$ composites.

This disclosure concerns increasing the strength of Al—$B_4C$ composites significantly with alloy addition.

We demonstrate here for the first time a new product wherein the Mg addition improves interfacial adhesion between the matrix and ceramic particles as a result of interfacial boride formation, and primarily contributes to the enhancement of strength of the composites. The experimentally observed strength of our Al—Mg—$B_4C$ composite is greater than 1.0 GPa for composite containing 12% $B_4C$.

Our method provides a new method of developing high-strength-light-weight composites and a new Al—Mg—$B_4C$ composite.

A purpose of this invention is to increase the strength of Al—$B_4C$ composites significantly with alloy addition.

Considerable work has been done to produce dispersion strengthened Metal matrix composites, MMCs, by adding various volume fractions of $B_4C$ in Al matrix. These hard ceramic particles are mostly added in liquid metal to form MMCs upon solidification. However, this method tends to produce more inhomogeneity upon solidification in the composites, because the solid/liquid interface pushes the hard ceramic particles towards the end, which results in inhomogeneity in the solidified product.

To achieve better homogeneity, aluminum based MMCs were manufactured in the solid state reinforced with $B_4C$ particles. Although, the composites show higher hardness as compared to the base Al alloys, the enhancement of hardness or strength level is relatively small as the bonding between Al and $B_4C$ is weak, and composites mostly fail as a result of de-bonding at metal/ceramic interface. It has been realized a thin layer of a metal-boride phase at the interface could improve the adhesion between Al and $B_4C$. In the temperature range of 600 to 700° C., mostly $AlB_2$ forms between Al and $B_4C$. At higher temperatures, other aluminum borides, $Al_4BC$ and $AlB_{12}$, have been reported. In addition, the hard ceramic particles need to be incorporated and finely dispersed within grains to impede the dislocation motion, so the Orowan strengthening mechanism is operative.

Thus, to increase the strength, one needs to improve the interfacial characteristics of the metal/ceramic interface as well as incorporate and disperse hard ceramic particles within the matrix.

The motivation here is to enhance the strength level of Al matrix composites close to or greater than 1 GPa, so the light-weight composites are comparable with the high-strength steel, titanium, and copper-base alloys.

Example 1

High energy ball milling was performed using a SPEX 8000M Mixer/Mill for approximately 30 minutes at room temperature with an initial mixture of $B_4C$, Al and Mg powder using a hardened steel vial with stainless steel balls.

Three different powder mixture with $B_4C$ varying from 5, 8 and 12 wt. % were produced using ball milling.

A small amount 4 wt. % Mg was added to the powder mixture.

The $B_4C$ particle size ranged from 0.2 to 5 μm with an average size of 0.5 μm, and Al powder particles were in the range of 0.1 to 0.25 μm.

Initially, we made green pellets under pressure with milled powder mixtures and kept the pellets at 615° C. for 30 min under the dynamic Ar atmosphere. These pellets were then consolidated at 600° C. and at ~1 GPa pressure to create dense composites. These consolidated specimens were then annealed at 630° C. for four hours under the dynamic Ar atmosphere.

To investigate the mechanical behavior, micro indentation hardness tests were performed using Vickers hardness measurements at 200 gm of load and dwell time of 15 seconds.

Example 2

A SEM and optical microscopy were used to characterize microstructure of the composites. Composites were subsequently characterized by x-ray diffraction (XRD) using a Rigaku 18 kW x-ray generator and a high-resolution powder diffractometer utilizing a Cu-Kα1 radiation. For transmission electron microscopy (TEM) and high-resolution TEM (HRTEM) observations, samples were prepared using a precision Gatan ion mill with a gun voltage of 4 kV, and a sputtering angle of 10°. A JEOL-2200FX analytical transmission electron microscope operated at 200 keV was then used to investigate the interface and fine scale microstructure of the composites.

Example 3

A SEM image Al-4 wt. % Mg-12 wt. % $B_4C$ of the consolidated composite after annealing at 630° C. for 4 h is shown in FIG. 1. The $B_4C$ particles in Al matrix appear considerably lighter in the image as compared to the Al matrix. The particle sizes were below 100 nm after milling and processing. The composites with 8 wt. % $B_4C$ is shown in FIG. 1. One could observe $B_4C$ particles are homogeneously distributed in both the composites. During consolidation process, the deformation occurs at the point of contact the metallic powders when an external pressure is applied at a high homologous temperature.

Example 4

Figure 2:
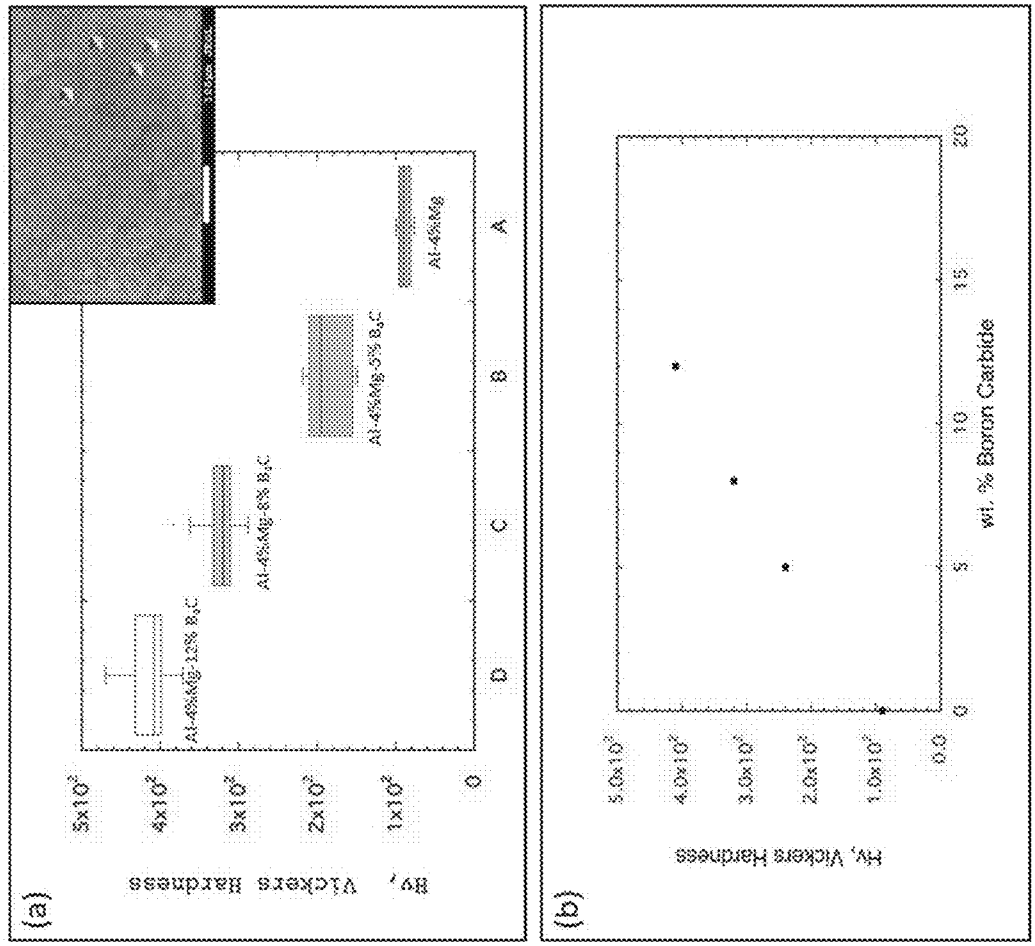
FIG. 2 illustrates Vickers hardness for all composites, showing considerable increase in hardness as compared to Al-4% Mg. SEM image of the indents of the Al-4% Mg-8% $B_4C$ at lower magnification at 200 g load shown as an inset.

We obtain Vickers hardness, which is usually the resistance to deformation, as a measure of mechanical response. It was observed that the hardness of the Al—Mg—$B_4C$ composites has been increased by 2 to 5 folds as compared to the hardness of the Al-4% Mg without $B_4C$ (FIG. 2). The Vickers hardness, $H_V$, for the 12 wt. % $B_4C$ composite is in the range of 360 to 460. For 5 and 8 wt. % $B_4C$, the Vickers hardness ranges from 140 to 210 and 260 to 360, respectively. The Vickers hardness of Al-4% Mg without the hard-ceramic particles is in the range of 75 to 95.

The increase in hardness is a good indication of increase in strength. Although there is a relationship between hardness and yield strength in metals and alloys, a number of experimental and modeling studies have assumed a factor of one third to obtain the yield strength data from Vickers hardness data. This suggests the strength of composite with 8% $B_4C$ is close to 1 GPa, and at higher level of $B_4C$ it is greater than 1 GPa. Some typical indents at 200 g load for Al-4 wt. % Mg-8 wt. % $B_4C$ composite are shown as an inset in FIG. 2. We observe that the surface due to indentation is not intergranular and no cracks emanates from the indents, suggesting Al—$B_4C$ composite is not brittle. One could see the average hardness increases almost linearly with the amount of $B_4C$ in the composite (FIG. 2).

Figure 3:
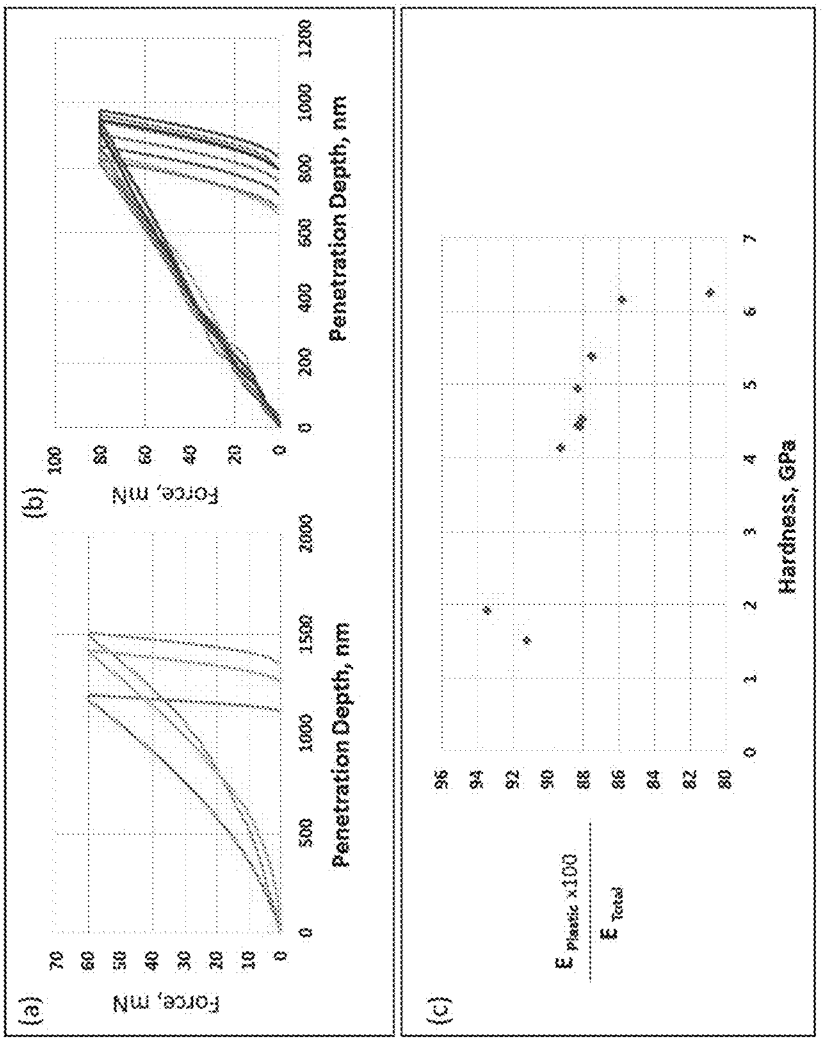
FIG. 3 illustrates Load vs penetration depth curves for the base alloy and Al-4% Mg-12% $B_4C$ composite, respectively. Illustrated is the ratio of plastic to total energy as a function of hardness for the composite and base alloy.

FIG. 3 shows a series of load vs penetration depth curves with standard linear loading at maximum loads of 60-80 mN for Al-4Mg and Al-4Mg-12$B_4C$ composite, respectively. The hardness and reduced modulus have been extracted, respectively, from the maximum load during loading and slope of the unloading curve knowing the projected area of the indents. The average hardness is 5.03±0.8 GPa and the Young modulus is 168.06±17.74 GPa for the Al-4Mg-12 $B_4C$ composite, while the Al-4Mg base alloy shows the hardness of 1.3 GPa and the Young modulus of 78.3 GPa.

To get the idea of deformation characteristics, we extracted the plastic energy ($W_p$) upon indentation and plotted the ratio of $W_p$ to $W_T$ with hardness, where $W_T$ is the total energy upon indentation (FIG. 3). The elastic, plastic and the total energy have been obtained by integrating the load-depth of penetration curve. The plastic energy of the Al-4Mg-12 $B_4C$ composite is 80 to 85% of the total energy, suggesting plastic deformation is significantly higher as compared to the elastic deformation. The plastic energy of the base alloy is around 90% of the total energy.

A fraction of hard $B_4C$ particles can be embedded within matrix grains due to the plastic flow as a result of deformation at high homologous temperature of the matrix during the consolidation process. In fact, we observe fine $B_4C$ particles within grains and grain boundaries of the matrix phase. TEM images (FIG. 4) of Al-4Mg-12$B_4C$ shows the fine $B_4C$ particles within a matrix grain. The matrix grains were observed to be elongated with a number $B_4C$ particles within grains could be observed. These embedded particles are in size range between 20-50 nm and the interparticle spacing is around nm. A number of $B_4C$ particles can also be seen at the grain boundary.

Figure 4:
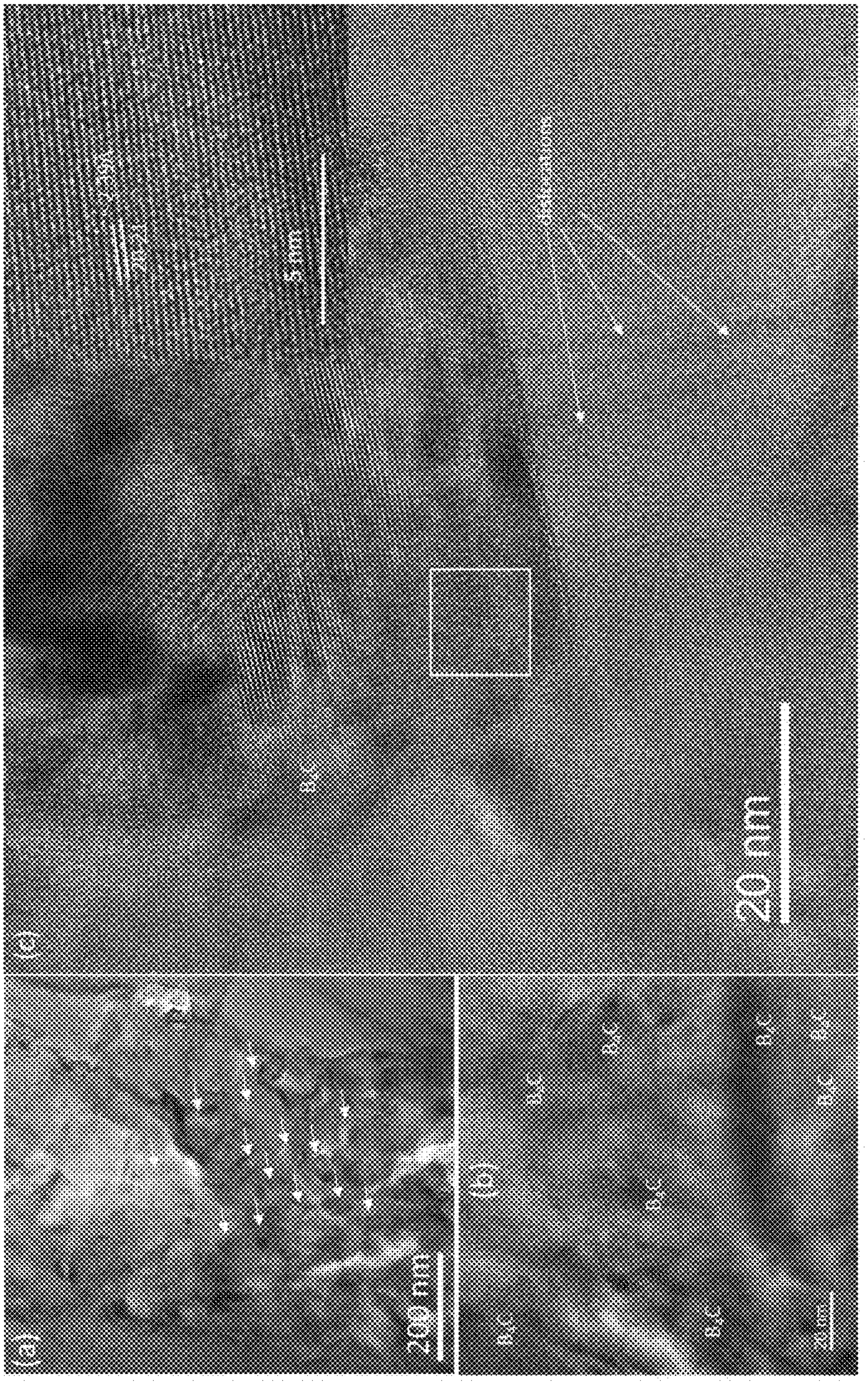
FIG. 4 illustrates TEM images showing the embedded $B_4C$ particles within an Al-matrix grain.
Figure 5:
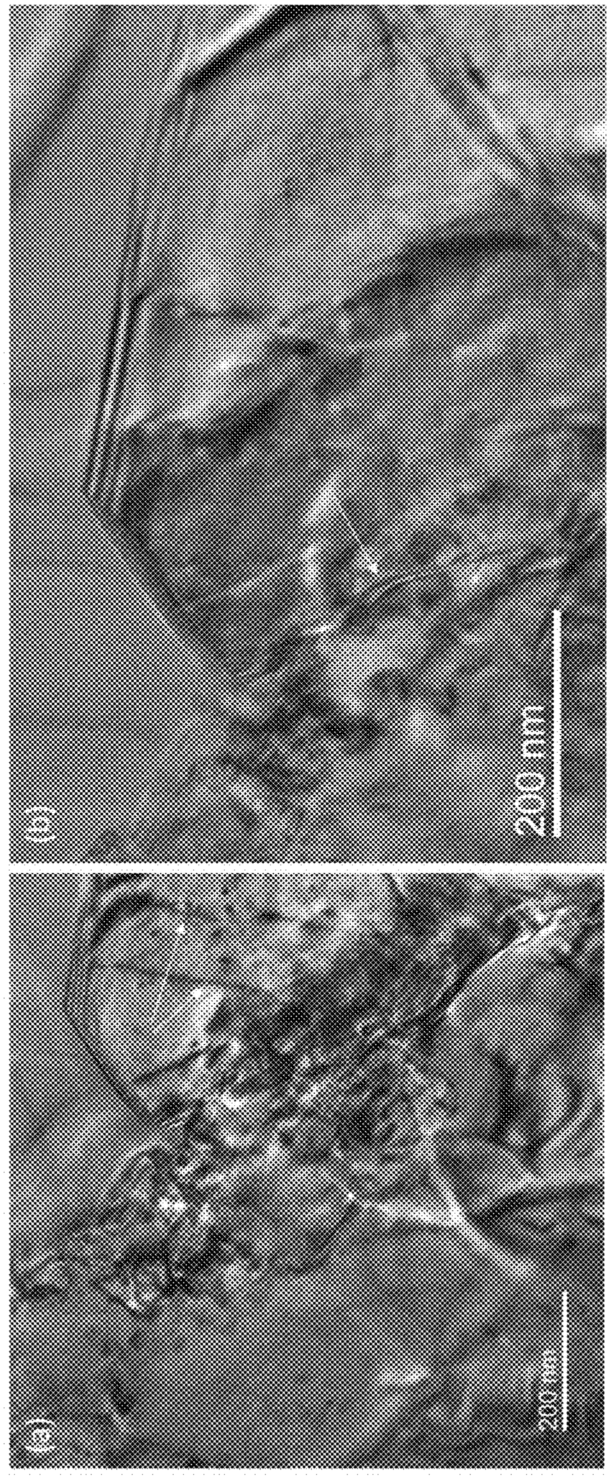
FIG. 5 illustrates TEM images showing Dislocations are pinned and bowed out by $B_4C$ particles within the matrix-grains. HRTEM image showing the pinning of dislocations by the particles. A high magnification HRTEM image is shown as an inset.
Figure 6:
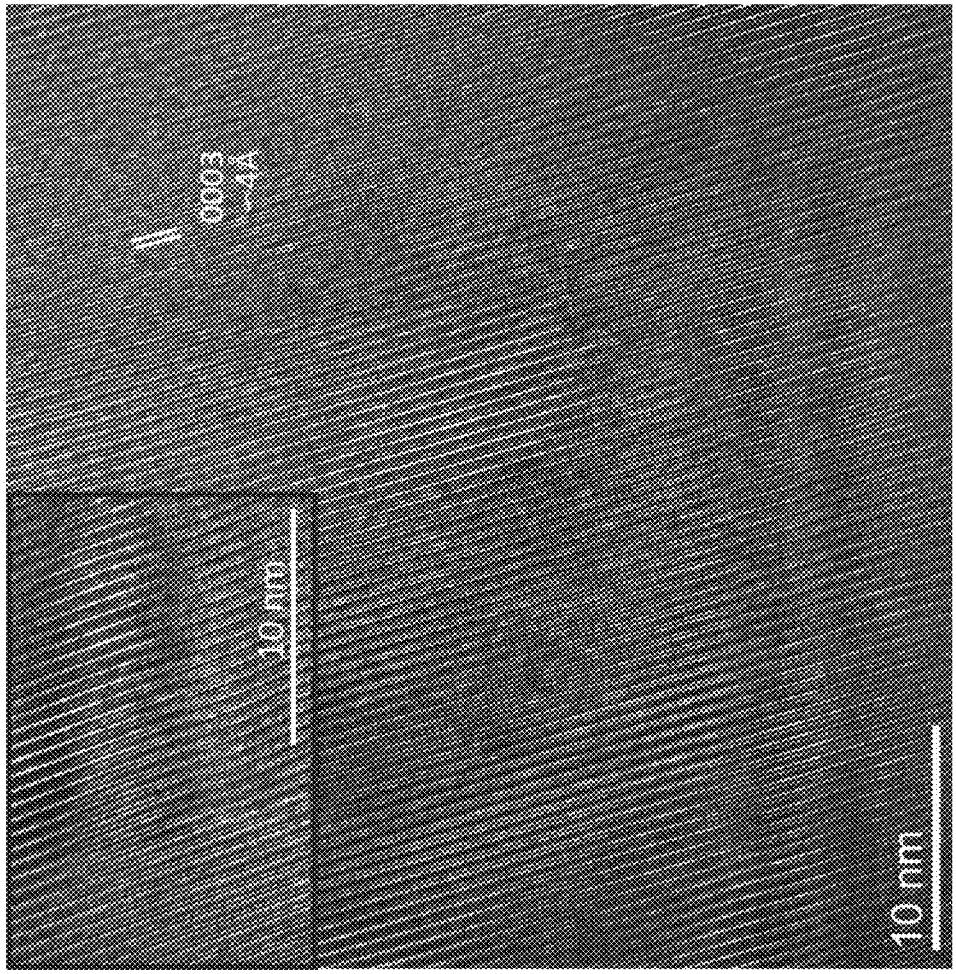
FIG. 6 illustrates HRTEM image of a $B_4C$ particle showing the 0003 lattice fringes. As a result of deformation, one could observe disorder and faults in $B_4C$ (see the inset).

A high magnification HRTEM image of the $B_4C$ particle is shown in FIG. 4, with an inset showing 20-21 lattice fringes of $B_4C$. Dislocations are observed to be pinned and bowed out by $B_4C$ particles within the matrix-grains (FIGS. 4 and 5). FIG. 6 is the HRTEM image of a $B_4C$ particle showing the 0003 lattice fringes. As a result of deformation, one could observe disorder and faults in $B_4C$ (see the inset).

Figure 7:
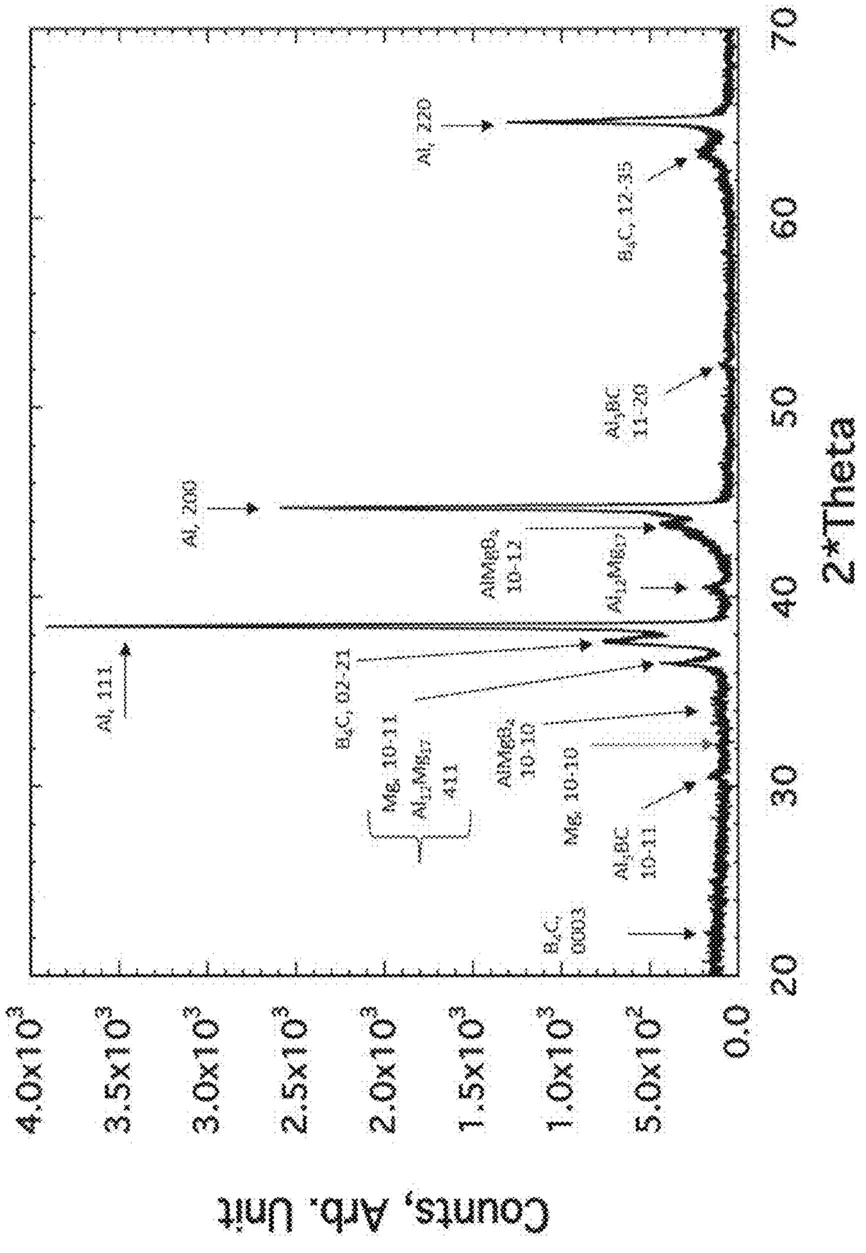
FIG. 7 illustrates X-ray diffraction pattern of the aluminum-4 wt. % magnesium-12 wt. % boron carbide composite, showing different phases including the aluminum-magnesium-boride phase.

We investigate the formation of other phases, particularly the boride phase in the matrix as well as at interfaces using XRD and TEM. FIG. 7 is the XRD of the composite with 12% $B_4C$ showing diffraction peaks of Al, Mg and $B_4C$. In addition, a number of peaks belonging to a Al—Mg-boride phase, $AlMgB_4$, a boro-carbide phase, $Al_3BC$, and an Al—Mg binary γ phase, $Al_{12}Mg_{17}$ were observed, indicating interfacial phase formation.

Figure 8:
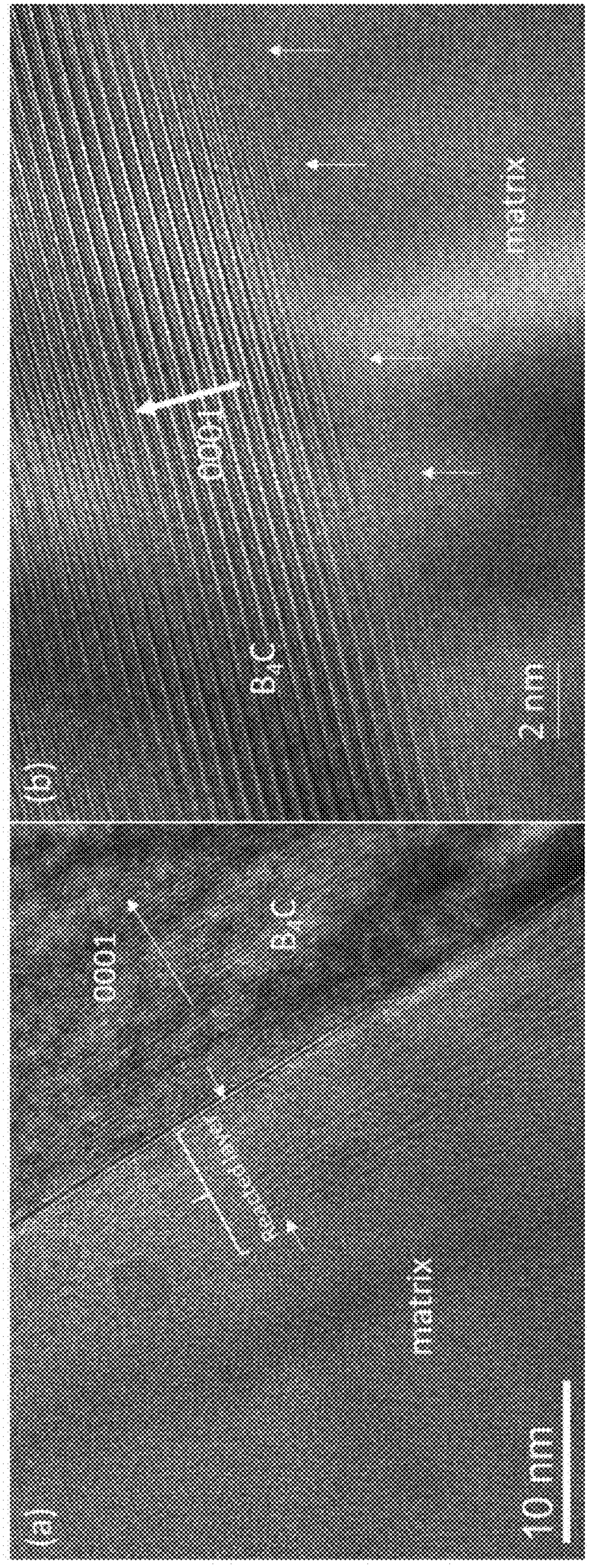
FIG. 8 illustrates a thin region of reacted layer at the $B_4C$/Al interface.

To better understand the nature and extent of the reacted layer we performed TEM studies at number of interfaces between $B_4C$ and Al matrix. A thin region of reacted layer at the $B_4C$/Al interface is shown in FIG. 8. In some regions, the partial decomposition of $B_4C$ as a result of reaction with the matrix starts at the basal plane of $B_4C$, which gives rise to the disappearance of 0003 fringes (FIG. 8) in some locations indicated by arrows in the basal plane of $B_4C$.

Figure 9:
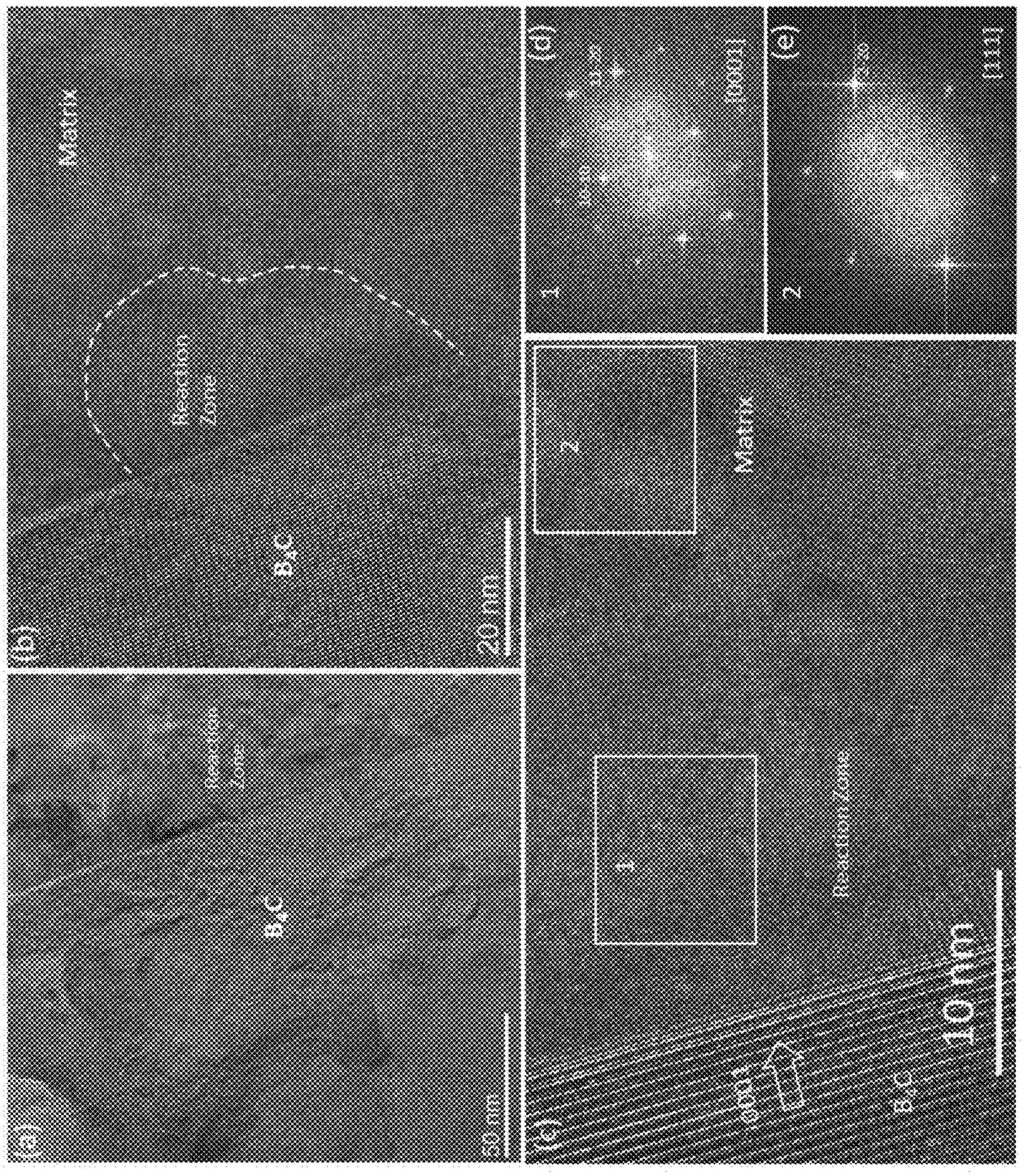
FIG. 9 illustrates a TEM image showing the interface between $B_4C$ and the matrix.

FIG. 9 is a low magnification TEM image showing the matrix/$B_4C$ interface with a reaction zone of ~20 nm thick, which is shown at a higher magnification in FIG. 9. A HRTEM image including the particle, reaction zone and the matrix is shown in FIG. 9. The corresponding fast Fourier transforms (FFTs) from the reaction zone and the matrix are shown in FIG. 8, respectively. The FFT from the reaction zone, as shown in FIG. 9, was indexed in terms of hexagonal $AlMgB_4$ phase (S.G. P/6mmm). The pattern is close to [0001] zone, showing the 10-10 and 11-20 type spots. The d-spacing of 10-10 and 11-20 spots is ~2.6 Å and ~1.5 Å, respectively, consistent with the XRD observations. On the other hand, the FFT from the matrix, as shown in FIG. 9, is close to the [111] zone showing the 2-20 type spots, corresponding to d-spacing of ~1.4 Å. The reacted Al—Mg boride layer forms due to the reaction with $B_4C$, Mg and Al, which can be written as $B_4C+Al+Mg=AlMgB_4+C$. As a result of the boride phase formation, some amount of carbon would be present in the composite as a reaction product.

Figure 10:
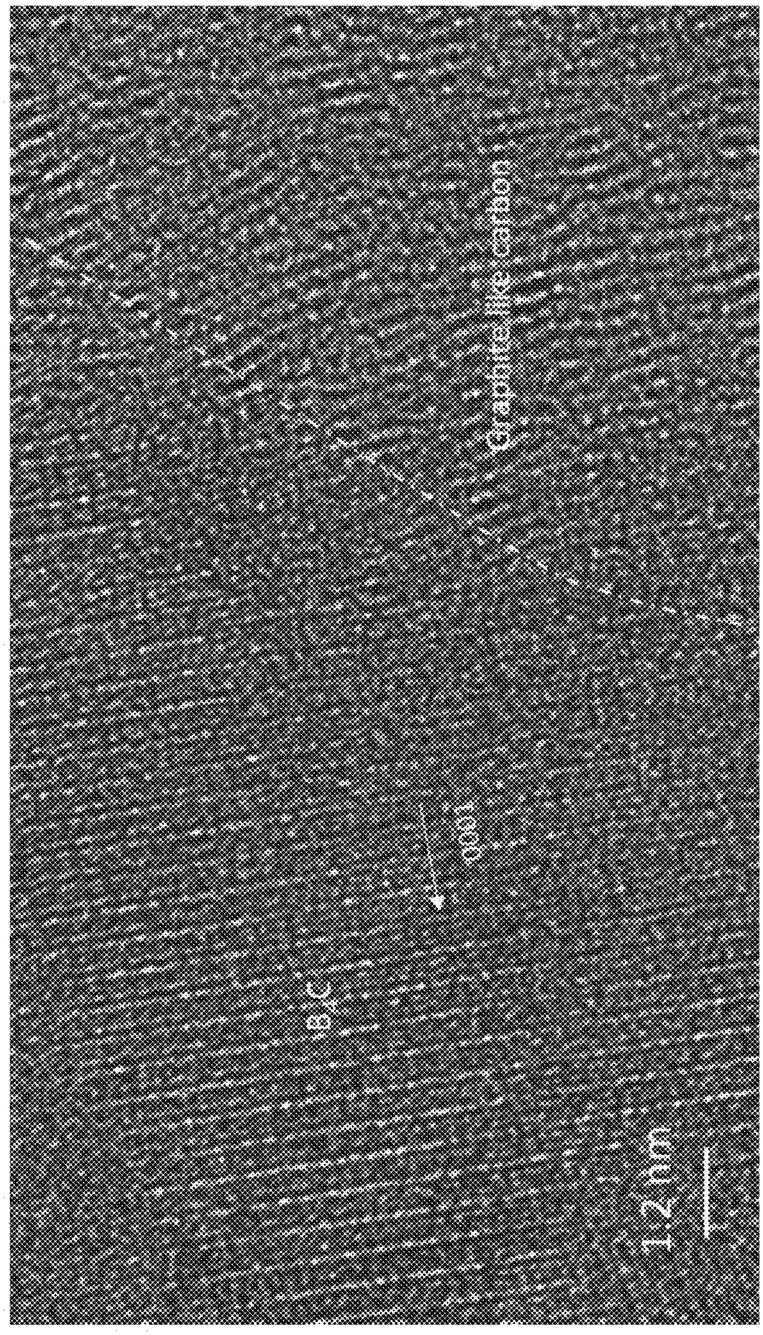
FIG. 10 illustrates the HRTEM image showing the $B_4C$ particle and a graphite-like phase.
Figure 11:
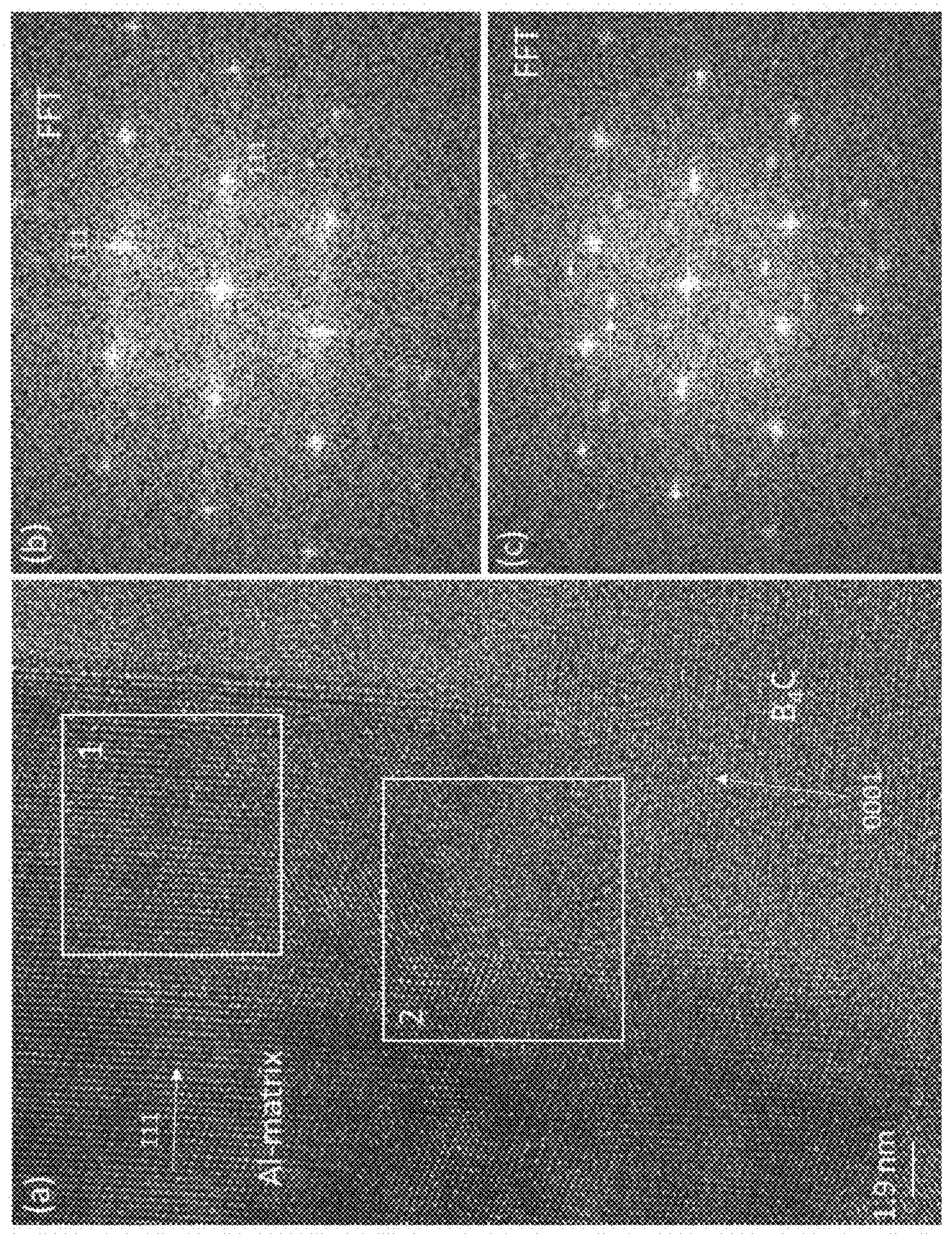
FIG. 11 illustrates a HRTEM image, showing $Al_3BC$ phase at the interface.

FIG. 10 is a HRTEM image showing the presence of a graphite like carbon close to a $B_4C$ particle. In addition, in some areas we observe the reaction between Al and $B_4C$ and the formation of $Al_3BC$ at the interface (FIG. 11). The FFTs obtained from the Al-matrix close to [1-10] zone, indicated by box 1, and the reacted layer along with matrix, indicated by box 2, are shown in FIG. 11, respectively. Extra reflection in FIG. 11, as indicated by arrow, is due to $Al_3BC$.

Figure 12:
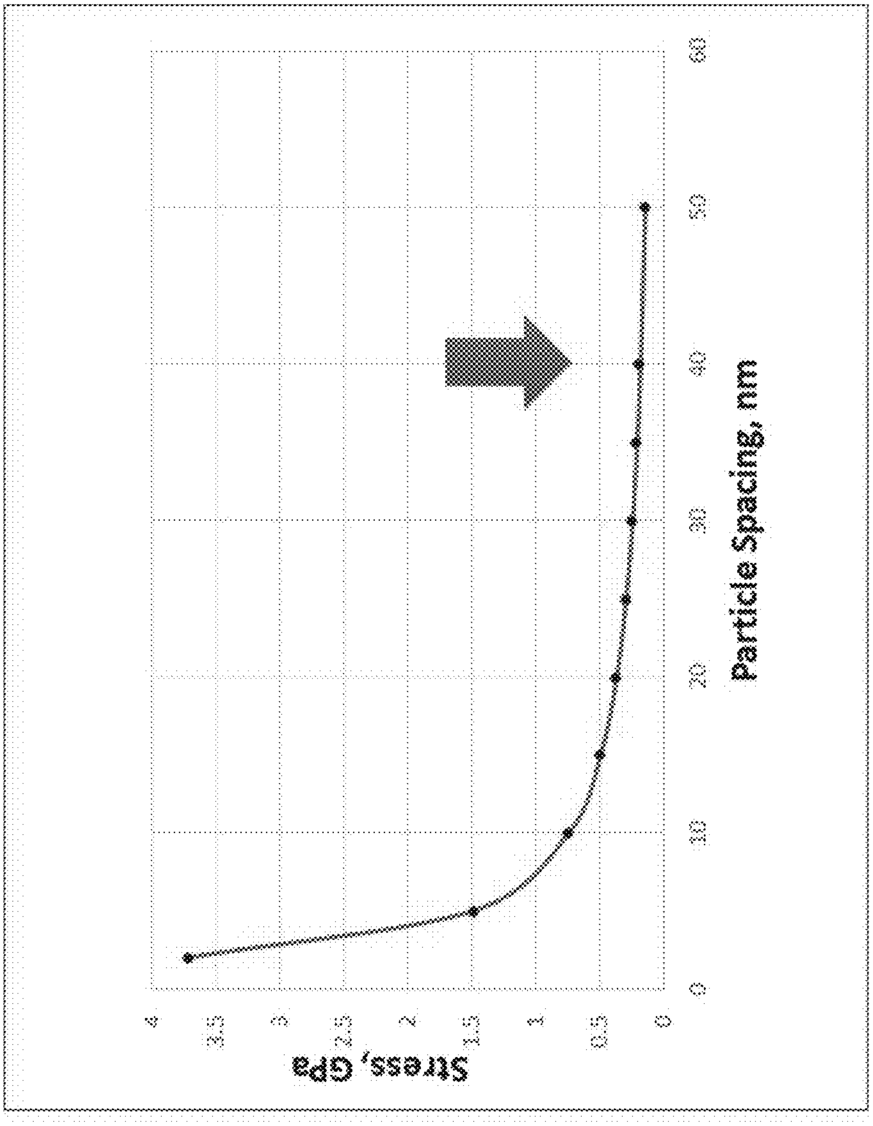
FIG. 12 illustrates a plot showing the increase in stress as a function of interparticle spacing, estimated using the Orowan strengthening method.

Here, we discuss a possible mechanism to account for the increase in strength. Since we see no evidence of shearing of the hard particles in the matrix by dislocations, one possibility is the so-called Orowan mechanism, where the increase in strength comes from the work needed to make the dislocations bypass the precipitates. The increase in yield strength, Δσ, due to the Orowan mechanism can be estimated using the following expression:

$$\Delta\sigma = 0.86Gb/\lambda \quad (1)$$

where λ is the inter-precipitate distance, G is the shear modulus, and b is the Burgers Vector. Considering G=26 GPa, b=0.286 nm, and λ=40 nm, the increase in strength from Eq. (1) is ~150 MPa. The increase in strength as a function of inter-particle spacing is shown in FIG. 12.

The average Vickers hardness value of the composite containing 12% $B_4C$ is 400.0, which is ~4.00 GPa, and the strength is 1.33 GPa. For the other composites, the experimentally observed hardness and strength are considerably higher than the predicted strength using Orowan mechanism. One could reasonably conclude that the increase in strength due to the Orowan mechanism would not fully account for the observed increase in strength in Al—Mg—$B_4C$ composites.

To quantify the dispersion strengthening by the ceramic particles, we estimate the hardness of the composite using the rule of mixture, which would be the upper limit. Ideally, the rule of mixture could be applied to quantify the strength of the composite if the interface is quite strong, as compared to the composite. Considering the hardness of $B_4C$ to be 30 GPa and the matrix to be 0.1 GPa, and the volume fraction of $B_4C$=17% in the matrix, one could estimate the hardness of the composite. The estimated hardness value for Al—Mg-12 wt. % $B_4C$ composite is ~5 GPa. The experimentally observed mean hardness for the Al—Mg-12 wt. % $B_4C$ composite is ~4.0 GPa, indicating the interfacial adhesion has been significantly improved by the Mg addition. In this case, the volume fraction of $B_4C$ in the composite was estimated from the ratio of the intensity of 20-21 peak of $B_4C$ to the intensity of 111 Al.

We demonstrated enhancement of hardness and strength of Al—Mg—$B_4C$ composites, manufactured by ball milling, deformation at high homologous temperature and post-annealing in the solid state.

The hardness of composites has been enhanced by two to five folds as compared to the Al-4% Mg processed in similar conditions.

The enhancement of strength level of Al matrix composites with 8 to 12% $B_4C$ is close to or greater than 1 GPa.

Plastic flow during deformation processing as well as post-annealing enables the incorporation of hard particles within grains of the Al-matrix. The enhancement of strength is partially attributed to the Orowan mechanism due to dislocation pinning by $B_4C$ particles in the matrix.

The major contribution to the enhancement of strength and hardness stems from the fine dispersion of hard $B_4C$ particles in the matrix.

We demonstrate here the addition of small amount of Mg in the composite improves the interface adhesion between Al matrix and $B_4C$ significantly. In addition, an $Al_3BC$ phase forms at the interface, which would also improve the adhesion between Al matrix and $B_4C$. This provides a new method of developing high-strength-light-weight composites.

Alternative materials can be Al—$Al_2O_3$ and Al—SiC composites.

Our approach facilitates the insertion of the $B_4C$ within grains of Al and enhances the adhesion between Al and $B_4C$ by forming interfacial Al—Mg-boride. This is a scalable process for manufacturing these new Al—Mg—$B_4C$ composites.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms “including”, “includes”, “having”, “has”, “with”, or variants thereof are used in the detailed description and/or in the claims, such terms are intended to be inclusive in a manner similar to the term “comprising”.

We claim:

1. A method of making an Al—$B_4C$ composite with Mg addition, comprising:

providing a first mixture of $B_4C$, Al and Mg powder;

mixing the first mixture of $B_4C$, Al and Mg powder;

wherein the $B_4C$ is an additive;

adding Mg to the powder mixture;

forming pellets from the powder mixture with the additional Mg;

maintaining the pellets at 615° C. for 30 minutes under Ar atmosphere;

deforming the pellets at 600° C. for 30 min;

annealing the composite at 630° C. for 4 hours under dynamic Ar atmosphere;

forming an Al—Mg-boride phase as an interfacial phase; and forming Al—AlMg boride-carbon—$B_4C$, comprising an alpha-Al matrix comprising Mg, B and C in the matrix.

2. The method of making an Al—$B_4C$ composite with Mg addition of claim 1 wherein the added Mg comprises 4% by weight of the powder mixture.

3. The method of making an Al—$B_4C$ composite with Mg addition of claim 2 wherein said step of mixing comprises ball milling for 30 min; and wherein the hardness of the Al—Mg—$B_4C$ composite increases by 2 to 5 folds as compared to the hardness of the Al-4% Mg without $B_4C$.

4. The method of making an Al—$B_4C$ composite with Mg addition of claim 3 wherein $B_4C$ is 5% or 8% or 12% by weight of the powder mixture.

5. The method of making an Al—$B_4C$ composite with Mg addition of claim 4 wherein the Mg addition improves interfacial adhesion between the matrix and ceramic particles as a result of interfacial boride formation and contributes to the enhancement of strength of the composite.

6. The method of making an Al—$B_4C$ composite with Mg addition of claim 5 wherein observed strength is greater than 1.0 GPa for the composite comprising 12% B4C by weight;

wherein the $B_4C$ particle size ranged from 0.2 to 5 μm with an average size of 0.5 μm;

wherein the Al powder particles were in the range of 0.1 to 0.25 μm; and wherein the Vickers hardness, $H_V$, for the composite comprising 12% $B_4C$ by weight;

is in the range of 360 to 460.

* * * * *